United States Patent
Richardson et al.

(10) Patent No.: US 10,785,975 B2
(45) Date of Patent: *Sep. 29, 2020

(54) WATER AND FEED ANTIMICROBIAL PRESERVATIVE

(75) Inventors: Kurt Richardson, Maysville, GA (US); Julio Pimentel, Buford, GA (US); James D. Wilson, Milton, FL (US)

(73) Assignee: ANITOX CORPORATION, Lawrenceville, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/388,449

(22) PCT Filed: Aug. 3, 2010

(86) PCT No.: PCT/US2010/044305
§ 371 (c)(1),
(2), (4) Date: Feb. 1, 2012

(87) PCT Pub. No.: WO2011/017367
PCT Pub. Date: Feb. 10, 2011

(65) Prior Publication Data
US 2012/0128843 A1 May 24, 2012

Related U.S. Application Data

(60) Provisional application No. 61/231,930, filed on Aug. 6, 2009.

(51) Int. Cl.
| | |
|---|---|
| *A01N 37/02* | (2006.01) |
| *A23L 3/3463* | (2006.01) |
| *A23L 3/3472* | (2006.01) |
| *A23L 3/3508* | (2006.01) |
| *A23L 3/3535* | (2006.01) |
| *A23K 20/105* | (2016.01) |
| *A23K 20/111* | (2016.01) |
| *A23K 20/121* | (2016.01) |

(52) U.S. Cl.
CPC .......... *A01N 37/02* (2013.01); *A23K 20/105* (2016.05); *A23K 20/111* (2016.05); *A23K 20/121* (2016.05); *A23L 3/3463* (2013.01); *A23L 3/3472* (2013.01); *A23L 3/3508* (2013.01); *A23L 3/3535* (2013.01); *Y02A 40/943* (2018.01)

(58) Field of Classification Search
CPC .... A23L 3/3535; A23L 3/3508; A23L 3/3472; A01N 37/02; A23K 20/105; A23K 20/111; A23K 20/121; Y02A 40/943
See application file for complete search history.

(56) References Cited

U.S. PATENT DOCUMENTS

| | | | |
|---|---|---|---|
| 2,154,449 A * | 4/1939 | Hoffman | A21D 2/145 426/19 |
| 3,615,653 A | 10/1971 | Fults et al. | |
| 3,682,653 A | 8/1972 | Mommer | |
| 4,112,122 A * | 9/1978 | Long | A21D 2/145 426/19 |
| 4,223,045 A * | 9/1980 | Fink | A23L 3/3463 426/335 |
| 4,404,040 A * | 9/1983 | Wang | A01N 37/02 134/22.14 |
| 4,701,331 A | 10/1987 | Grabitz | |
| 4,772,481 A | 9/1988 | Rohwer et al. | |
| 4,824,686 A | 4/1989 | Dunn et al. | |
| 5,093,124 A | 3/1992 | Kulenkampff | |
| 5,139,779 A | 8/1992 | McNeff | |
| 5,198,253 A | 3/1993 | Roskowiak et al. | |
| 5,240,727 A | 8/1993 | McNeff | |
| 5,260,260 A | 11/1993 | Gednalske et al. | |
| 5,279,838 A | 1/1994 | McNeff | |
| 5,330,769 A * | 7/1994 | McKinzie | A01N 25/02 424/605 |
| 5,342,630 A | 8/1994 | Jones | |
| 5,366,995 A | 11/1994 | Savage et al. | |
| 5,462,714 A * | 10/1995 | Talwalker | A01N 59/12 422/28 |
| 5,505,976 A | 4/1996 | Bland et al. | |
| 5,518,750 A | 5/1996 | Mcneff | |
| 5,547,987 A | 8/1996 | Bland et al. | |
| 5,587,358 A | 12/1996 | Sukigara et al. | |
| 5,591,467 A | 1/1997 | Bland et al. | |
| 5,663,152 A | 9/1997 | Hayano et al. | |
| 5,698,599 A | 12/1997 | Subbiah | |
| 5,776,919 A | 7/1998 | Sukigara et al. | |
| 5,911,915 A | 6/1999 | Fonsny et al. | |
| 6,103,768 A | 8/2000 | Savage et al. | |

(Continued)

FOREIGN PATENT DOCUMENTS

| | | | | |
|---|---|---|---|---|
| AU | 1995016317 A | * | 10/1995 | |
| CA | 553057 A | * | 2/1958 | |

(Continued)

OTHER PUBLICATIONS

Andersen et al., "Structure-Antifungal Activity Relationships Among Volatile C6 and C9 Aliphatic Aldehydes, Ketones, and Alcohols", Journal of Agricultural Food Chemistry, 1994, pp. 1563-1568, vol. 42.

Archbold et al., "Fumigating 'Crimson Seedless' Table Grapes with (E)-2-Hexenal Reduces Mold During Long-Term Postharvest Storage", HortScience, 1999, pp. 705-707, vol. 34 No. 4.

Babic et al., "Antimicrobial Activity of Shredded Carrot Extracts on Food-Borne Bacteria and Yeast", Journal of Applied Bacteriology, 1994, pp. 135-141, vol. 76 No. 2.

Beck et al., "Fungicidal Activities of Dihydroferulic Acid Alkyl Ester Analogues", Journal of Natural Products, 2007, pp. 779-782, vol. 70 No. 5.

Belletti et al., "Antimicrobial Activity of Aroma Compounds Against *Saccharomyces cerevisiae* and Improvement of Microbiological Stability of Soft Drinks as Assessed by Logistic Regression", Applied and Environmental Microbiology, 2007, pp. 5580-5586, vol. 73 No. 17.

(Continued)

*Primary Examiner* — Nikki H. Dees
(74) *Attorney, Agent, or Firm* — Thompson Coburn LLP; Steven M. Ritchey

(57) ABSTRACT

Antimicrobial compositions containing buffered propionic or acetic acid mixed with pelargonic acid.

18 Claims, No Drawings

(56) References Cited

U.S. PATENT DOCUMENTS

| | | | |
|---|---|---|---|
| 6,121,224 | A | 9/2000 | Fonsny et al. |
| 6,136,856 | A | 10/2000 | Savage et al. |
| 6,139,890 | A * | 10/2000 | Simpukas ............... A23B 7/154 426/268 |
| 6,183,794 | B1 * | 2/2001 | Kaesler .................. A01N 37/02 426/335 |
| 6,201,026 | B1 | 3/2001 | Hammond et al. |
| 6,218,336 | B1 * | 4/2001 | Coleman ................ A01N 37/04 504/118 |
| 6,221,381 | B1 | 4/2001 | Shelford et al. |
| 6,323,171 | B1 | 11/2001 | Fonsny et al. |
| 6,326,032 | B1 * | 12/2001 | Richter et al. ................. 424/616 |
| 6,387,866 | B1 | 5/2002 | Mondin et al. |
| 6,468,953 | B1 * | 10/2002 | Hitchems et al. ............ 510/218 |
| 6,472,358 | B1 * | 10/2002 | Richter ................ C11D 3/2079 424/718 |
| 6,479,044 | B1 | 11/2002 | Mahieu et al. |
| 6,479,454 | B1 * | 11/2002 | Smith et al. .................. 510/503 |
| 6,482,463 | B1 | 11/2002 | Mologni et al. |
| 6,596,681 | B1 | 7/2003 | Mahieu et al. |
| 6,596,763 | B1 | 7/2003 | Thormar et al. |
| 6,638,978 | B1 | 10/2003 | Kabara |
| 6,852,340 | B1 * | 2/2005 | Gaumer ................. A01N 59/12 424/667 |
| 6,960,350 | B2 | 11/2005 | Hanada et al. |
| 7,060,301 | B2 * | 6/2006 | Wei ......................... A01N 37/16 422/29 |
| 7,134,957 | B2 | 11/2006 | Clayton et al. |
| 7,638,114 | B1 | 12/2009 | Schur |
| 7,645,464 | B2 | 1/2010 | Hansen |
| 7,652,067 | B2 | 1/2010 | Erman et al. |
| RE41,279 | E * | 4/2010 | McSherry .............. A01N 59/00 424/405 |
| 7,862,842 | B2 | 1/2011 | Beltran et al. |
| 7,915,207 | B2 * | 3/2011 | Herdt ..................... A01N 37/02 510/111 |
| 7,943,565 | B2 * | 5/2011 | Kany ................... C11D 3/0047 424/405 |
| 2001/0046979 | A1 | 11/2001 | Roselle et al. |
| 2002/0009527 | A1 | 1/2002 | Bland et al. |
| 2002/0034568 | A1 | 3/2002 | Blyth |
| 2003/0176500 | A1 | 9/2003 | Molly |
| 2003/0228402 | A1 * | 12/2003 | Franklin et al. .............. 426/541 |
| 2004/0266852 | A1 | 12/2004 | Coleman |
| 2005/0031744 | A1 | 2/2005 | Paliyath et al. |
| 2005/0161636 | A1 * | 7/2005 | Man ....................... A01N 37/16 252/186.1 |
| 2005/0170052 | A1 | 8/2005 | Pimentel |
| 2005/0192197 | A1 * | 9/2005 | Man ....................... A01N 37/16 510/375 |
| 2005/0214291 | A1 * | 9/2005 | Lee et al. ................... 424/144.1 |
| 2005/0260243 | A1 | 11/2005 | Lynch et al. |
| 2007/0027119 | A1 * | 2/2007 | Ahmed .................. A01N 31/02 514/159 |
| 2007/0087094 | A1 | 4/2007 | Schuer |
| 2009/0061017 | A1 * | 3/2009 | Pedersen ............... A01N 37/16 424/616 |
| 2009/0082253 | A1 | 3/2009 | Otto et al. |
| 2009/0263549 | A1 * | 10/2009 | Kleve et al. .................. 426/332 |
| 2010/0056413 | A1 * | 3/2010 | Harry, Jr. ............... A47L 17/00 510/197 |
| 2010/0204323 | A1 | 8/2010 | Theiler et al. |
| 2010/0234460 | A1 * | 9/2010 | Foret ..................... A01N 37/02 514/558 |
| 2012/0128843 | A1 | 5/2012 | Richardson et al. |
| 2012/0252893 | A1 | 10/2012 | Pimentel |
| 2014/0323572 | A1 | 10/2014 | Pimentel et al. |
| 2015/0031762 | A1 | 1/2015 | Pimentel et al. |
| 2015/0208697 | A1 | 7/2015 | Richardson et al. |

FOREIGN PATENT DOCUMENTS

| | | |
|---|---|---|
| CN | 101233852 | 8/2008 |
| CN | 102469810 A | 5/2012 |
| DE | 161131 A1 | 2/1985 |
| EP | 0208403 | 1/1987 |
| EP | 0244144 | 11/1987 |
| EP | 0363733 A2 | 4/1990 |
| EP | 2283733 A1 | 2/2011 |
| JP | 62-126938 | 6/1987 |
| JP | 2000-325037 A | 11/2000 |
| JP | 2003-535894 | 2/2003 |
| JP | 2005-511635 | 4/2005 |
| JP | 2007-505125 | 3/2007 |
| RU | 2176889 C2 | 12/2001 |
| RU | 2288592 C1 | 12/2006 |
| RU | 2303357 C2 | 7/2007 |
| RU | 2321273 C1 | 4/2008 |
| SU | 701631 A1 | 12/1979 |
| WO | 95/28091 A1 | 10/1995 |
| WO | 96/11585 A1 | 4/1996 |
| WO | 96/24247 A1 | 8/1996 |
| WO | 97/28896 A1 | 8/1997 |
| WO | 97/42836 A1 | 11/1997 |
| WO | 98/03066 A1 | 1/1998 |
| WO | 99/37172 A1 | 7/1999 |
| WO | 99/60865 A1 | 12/1999 |
| WO | WO 0132020 A2 * | 5/2001 |
| WO | WO 01/97799 | 12/2001 |
| WO | 02/38684 A1 | 5/2002 |
| WO | WO 03/044145 | 5/2003 |
| WO | 03070181 A2 | 8/2003 |
| WO | 03/096807 A1 | 11/2003 |
| WO | 2006/024620 A1 | 3/2006 |
| WO | 2008/031087 A1 | 3/2008 |
| WO | 2009/037270 A1 | 3/2009 |
| WO | 2011/017367 A2 | 2/2011 |
| WO | 2011025496 A1 | 3/2011 |

OTHER PUBLICATIONS

Bergaoui et al., "Chemical Composition and Antifungal Activity of Volatiles from Three Opuntia Species Growing in Tunisia", Pakistan Journal of Biological Sciences, Jan. 1, 2007, pp. 2485-2489, vol. 10 No. 15.
Bisignano et al., "In Vitro Antibacterial Activity of Some Aliphatic Aldehydes from *Olea europaea* L.", FEMS Microbiology Letters, 2001, pp. 9-13, vol. 198.
Burdock, "Fenaroli's Handbook of Flavor Ingredients—5th Edition", 2005, pp. 1330, CRC Press, Boca Raton.
Chandler et al., "Characterization of the Wetting and Dewetting Behavior of Powders", KONA Powder and Particle Journal, 2007, pp. 56-75, vol. 25.
Chandrasekaran et al., "Antibacterial and Antifungal Efficacy of Organic Acid Methyl Esters from the Leaves of *Sesuvium portulacastrum* L.", European Review for Medical and Pharmacological Science, 2011, pp. 775-780, vol. 15 No. 7.
Choi et al., "Antifungal Activity of Lower Alkyl Fatty Acid Esters Against Powdery Mildews", The Plant Pathology Journal, 2010, pp. 360, vol. 26 No. 4.
Clark et al., "Effects of Marker Selection and Mix Time on the Coefficient of Variation (Mix Uniformity) of Broiler Feed", Journal of Applied Poultry Research, 2007, pp. 464-470, vol. 16.
Cosmetic Ingredient Review, "Final Report on the Safety Assessment of PEG-30, -33, -35, -36, and -40 Castor Oil and PEG-30 and PEG-40 Hydrogenated Castor Oil", International Journal of Toxicology, 1997, pp. 269-306, vol. 16.
Deng et al., "Effects of Six-Carbon Aldehydes and Alcohols on Bacterial Proliferation", Journal of Agricultural Food Chemistry, 1993, pp. 506-510, vol. 41.
Extended European Search Report for EP Application 12854061.4 dated Apr. 8, 2015.
Fallik et al., "(E)-2-Hexenal Can Stimulate Botrytis Cinerea Growth in Vitro and on Strawberries In Vivo During Storage", Journal of the American Society of Horticulture Science, 1998, pp. 875-881, vol. 123 No. 5.

(56) References Cited

OTHER PUBLICATIONS

Froetschner, Marketing Manager, DSM Nutritional Products, Inc. Parsippany, NJ, "Mixing: A Detailed Look at the Factors that Influence Mix Uniformity" nmfeed.com/files/posts/portal1/4(70). pdf, Penn State Dairy Cattle Nutrition Workshop, 2005, pp. 19-38.
Fruijtier-Polloth, "Safety Assessment on Polyethylene Glycols (PEGs) and their Derivatives as used in Cosmetic Products", Toxicology, 2005, pp. 1-38, vol. 214.
Gardini et al., "Effect of Trans-2-Hexenal on the Growth of Aspergillus Flavus in Relation to its Concentration, Temperature and Water Activity", Letters in Applied Microbiology, 2001, pp. 50-55, vol. 33.
Hamilton-Kemp et al., "Inhibition of Pollen Germination by Volatile Compounds Including 2-Hexenal and 3-Hexenal", Journal of Agricultural Food Chemistry, 1991, pp. 952-956, vol. 39.
Herrman et al., "Testing Mixer Performance", Kansas State University Extension Service Bulletin, 1994, pp. 1-4.
Huang et al., "Antimicrobial activity of n-6, n-7 and n-9 Fatty Acids and their Esters for Oral Microorganisms", Archives of Oral Biology, 2010, pp. 555-560, vol. 55 No. 8.
Hubert et al,. "Plant Volatile Aldehydes as Natural Insecticides Against Stored-Product Beetles", Pest Management Science, 2008, pp. 57-64, vol. 64.
International Search Report for PCT/US2012/046821 dated Apr. 4, 2013.
International Search Report for PCT/US2012/063655 dated Feb. 14, 2013.
Kim et al., "Volatile Constituents from the Leaves of Callicarpa Japonica Thunb. and their Antibacterial Activities", Journal of Agriculture and Food Chemistry, 2004, pp. 781-787, vol. 52.
Kubo et al., "Anti-Helicobacter Pylori Agents from the Cashew Apple", Journal of Agriculture and Food Chemistry, 1999, pp. 533-537, vol. 47.
Kubo et al., "Naturally Occurring Anti-*Salmonella* Agents", Journal of Agriculture and Food Chemistry, 2001, pp. 5750-5754, vol. 49.
Madriz-Guzman et al., "In Vitro Effect and in the Field of Methyl Esters Oils from Castor, Palm and Soybean on Mycosphaerella Fijiensis, Causal Agent of Black Sigatoka in Bananas (MUSA AAA)", Corbana, 2008, pp. 11-27, vol. 34 No. 61.
Merkl et al., "Antimicrobial and Antioxidant Properties of Phenolic Acids Alkyl Esters", Czech Journal of Food Science, 2010, pp. 275-279, Vo. 28 No. 4.
Meyer et al., "Determination of Cremophor® EL in Plasma after Sample Preparation with Solid Phase Extraction and Plasma Protein Precipitation", Journal of Pharmaceutical and Biomedical Analysis, 2001, pp. 495-506, vol. 24.
Muroi et al., "Antimicrobial Activity of Cashew Apple Flavor Compounds", Journal of Agriculture and Food Chemistry, 1993, pp. 1106-1109, vol. 41.
Nakamura et al., "Green-Leaf-Derived C6-Aroma Compounds with Potent Antibacterial Action that act on both Gram-Negative and Gram-Positive Bacteria", Journal of Agriculture and Food Chemistry, 2002, pp. 7639-7644, vol. 50 No. 26.
Nandi et al., "Volatile Aldehydes, Ketones, Esters and Terpenoids as Preservatives Against Storage Fungi in Wheat", Journal of Plant Diseases and Protection, Jan. 1, 1976, pp. 284-294, vol. 83 No. 5.
Neri et al., "Activity of Trans-2-Hexenal Against Penicillium Expansum in 'Conference' Pears", Journal of Applied Microbiology, 2006, pp. 1186-1193, vol. 100.
Neri et al., "Control of Penicillium Expansum in Pears and Apples by Trans-2-Hexenal Vapours", Postharvest Biology and Technology, 2006, pp. 101-108, vol. 41.
Neri et al., "Fungicidal Activity of Plant Volatile Compounds for Controlling Monilinia Laxa in Stone Fruit", Plant Disease, 2007, pp. 30-35, vol. 91 No. 1.
Nivinskiene et al., "Influence of Urban Environment on Chemical Composition of Tilia Cordata Essential Oil", Chemija, 2007, pp. 44-49, vol. 18 No. 1.
Paster, "A Commercial Scale Study of the Efficiency of Propionic Acid and Calcium Propionate as Fungistats in Poultry Feed", Poultry Science, 1979, pp. 572-576, vol. 58.
Patrignani et al., "Effects of Sub-Lethal Concentrations of Hexanal and 2-(E)-Hexenal on Membrane Fatty Acid Composition and Volatile Compounds of Listeria Monocytogenes, Staphylococcus aureus, Salmonella enteritidis and Escherichia coli.", International Journal of Food Microbiology, 2008, pp. 1-8, vol. 123.
Polkhovskaya N. kompaniya Biochem na konferentsii <<Kombikorma-2012>>, Jun. 6, 2012, [online] [Retrieved on Feb. 26, 2013] Retrieved from the Internet: URL:http://www.milkua.info. uklcompanynews/464/, pp. 1-2.
Sadek et al., "Synthesis and Evaluation of Some Fatty Esters as Plasticizers and Fungicides for Poly(vinyl acetate) Emulsion", Journal of Chemistry, Technology, and Biotechnology, 1995, pp. 160-164, vol. 63 No. 2.
Saniewska et al., "The Effect of Trans-2-Hexenal and Trans-2-Nonenal on the Mycelium Growth of Phoma Narcissi in Vitro", Roczniki Akademii Rolniczej w Poznaniu—CCCLXXXIII, Ogrodn., 2007, pp. 189-193, vol. 41.
Search Report for TW Application No. 101147408 dated Apr. 21, 2014.
Singh, "Effect of Different Additives on Cloud Point of Non Iconic Surfactant", Bachelor of Technology thesis, Department of Chemical Engineering, National Institue of Technology, Rourkela, India, 2001.
Stark et al., "On-farm Feed Uniformity Survey", Swine Day Report No. 641 Kansas State University, 1991, pp. 144-145.
Strobel et al., "Volatile Antimicrobials from Muscodor Albus, a Novel Endophytic Fungus", Microbiology, 2001, pp. 2943-2950, vol. 147.
Van Immerseel et al., "The Use of Organic Acids to Combat *Salmonella* in Poultry: a Mechanistic Explanation of the Efficacy", Avian Pathology, 2006, pp. 182-188, vol. 35 No. 3.
Written Opinion of the International Search Authority for PCT/US2012/046821 dated Apr. 4, 2013.
Written Opinion of the International Search Authority for PCT/US2012/063655 dated Feb. 14, 2013.
Chandler et al., "Characterization of the Wetting and Dewetting Behavior of Powders", KONA Powder and Particle Journal, 2007, pp. 56-75, vol. 25 (abstract of reference previously submitted on Jul. 11, 2016).
Supplementary European Search Report for EP 10807056, dated Sep. 15, 2014.
Feb. 10, 2011, International Search Report for PCT/US2010/044305.
Feb. 16, 2012, International Preliminary Report on Patentability for PCT/US2010/044305.
Anderson, R C. et. al 2004, Effect of drinking-water administration of experimental chlorate ion preparations on *Salmonella enterica serovar* Typhhmirhim colonization in weaned and finished pigs, Vet. Res. Comm. 28(3): 179-189.
Aneja, M., T. J . Gianfagna,and K. P. Hebbar, 2005. 7richoderma harzianumproduces nonanoic acid, an inhibitor of spore germination and mycelial growth of two cacao pathogens. Physiol. Mol. Plant Pathol. 67: 304-307.
Chadeganipour and Haims, 2001 Antifungal activities of nonanoic and capric acid on Microsporum gypseum. Mycoses 44(3-4): 109-112.
Henderson, S. et. al., 1999, "Early events in the pathogenesis of avian salmonellosis", Infec. Immun. 67(7): 3580-3586.
Hirazawa, N., 2001. Antiparasitic effect of medium-chain organic acids against ciliated Cryptocaryon irritans infestation in the red sea bream Pagrus major. Aquaculture 198: 219-228.
Humphrey, TJ. et. al, 1994, "Contamination of egg shell and contents with *Salmonella enteritidis*", Int. J. Food Microbiol. 21 (1-2): 31-40.
Keller, L.H. et. al., 1995, *Salmonella enteritidis* colonization of the reproductive tract and forming and freshly laid eggs of chickens, Infec. Immun. 63 (7): 2443-2449.

(56) References Cited

OTHER PUBLICATIONS

Lederer, B., T. Fujimori, Y. Tsujino, K. Wakabayashi and P. Boger, 2004. Phytotoxic activity of middle-chain organic acids II: peroxidation and membrane effects. Pesticide Biochemistry and Physiology 80: 151-156.
Haque et al., "Propionic Acid is an Alternative to Antibiotics in Poultry Diet", Bangladesh Journal of Animal Science, 2009, pp. 115-122, vol. 38, No. 1&2.
Karabinos et al., "Bactericidal Activity of Certain Fatty Acids", The Journal of American Oil Chemists's Society, Jun. 1954, pp. 228-232, vol. 31.
Lin et al., "Comparative Analysis of Extreme Acid Survival in *Salmonella typhimurium*, Shigella flexneri, and *Esherichia coli*", Journal of Bacteriology, Jul. 1995, pp. 4097-4104, vol. 177, No. 14.
Opdyke, "Fragrance Raw Material Monographs", Food and Cosmetics Toxicology, Jun. 1974, pp. 839-841, vol. 12.
Opposition against EP2768539, filed on Sep. 4, 2017, 16 pages.
Opposition against EP3023009, Filed on Sep. 4, 2017, 15 pages.
Ponce De Leon et al., "Effect of Acetic and Citric Acids on the Growth and Activity (VB-N) of *Pseudomonas* sp. and *Moraxella* sp.", Bulletin of the Faculty of Fisheries Hokkaido University, May 1993, pp. 80-85, vol. 44, No. 2.
Results of Experiments on the Antimicrobial Effects of the Compositions Claimed of Various Microorganisms, Sep. 4, 2017, 1 page.
Written Submission filed by Opponent against EP 3023009, filed Oct. 10, 2018, 9 pages.
Crozier-Dodson, "Formulating Food Safety: An Overview of Antimicrobial Ingredients", Food Safety Magazine, Dec. 2004/Jan. 2005, 9 pgs.
Johnston et al., "Vinegar: Medicinal Uses and Antiglycemic Effect", MedGenMed, 2006, 8(2), 10 pgs.

\* cited by examiner

WATER AND FEED ANTIMICROBIAL PRESERVATIVE

CROSS REFERENCE TO RELATED APPLICATIONS

This application is a national stage entry of PCT/US2010/044305, filed Aug. 3, 2010, which claims priority to provisional application 61/231,930, filed Aug. 6, 2009, entitled "WATER AND FEED PRESERVATIVE".

BACKGROUND OF THE INVENTION

Field of the Invention

A method to extend the shelf-life of water, feed and major feed ingredients by spray-treating or admixing a mixture of organic acids containing pelargonic acid.

Background

Food borne illnesses are common problems for millions of people around the world. Food borne illnesses are caused by many different microorganisms, including infections by *Campylobacter* spp., *Shigella* spp., *Listeria monocytogenes*, *Yersenia enterolitica*, *Salmonella* spp. and *E. coli* which are prevalent in many countries. CDC statistics in the United States suggest that 76 million people become sick each year due to consumption of undercooked meat, eggs, shellfish, unpasteurized dairy products, and unwashed vegetables. Food producing animals are the major reservoir of non-typhi serotypes of *Salmonella enterica*, which causes an estimated 1.4 million illnesses, 16,400 hospitalizations and 580 U.S. deaths/year.

*Salmonella* is a facultative, intracellular pathogen capable of infesting humans and animals resulting in infection. After ingestion, *Salmonella* can escape the confines of the intestine, can penetrate the intestine and can be transported by the blood to internal organs (Henderson, S. et. al., 1999, *Early events in the pathogenesis of avian salmonellosis*, Infec. Immun. 67(7): 3580-3586).

The majority of salmonellosis cases in humans appear due to consumption of hen's eggs. Two days after hens are orally challenged with *Salmonella*, the bacteria can be detected in the spleen, liver, heart, gall bladder tissues, intestinal tissues and various sections of the oviduct (Humphrey, T. J. et. al, 1994, *Contamination of egg shell and contents with Salmonella enteritidis*, Int. J. Food Microbiol 21 (1-2): 31-40). Some factors present in eggs help to maintain lower *Salmonella* levels in freshly laid eggs (0.6% incidence) even though eggs from the oviduct of the same hen showed higher salmonella levels (29% incidence); these factors may include antibodies, antibacterial enzymes and iron-sequestering and bacterial protease-inhibiting proteins in yolk and albumen (Keller, L. H. et. al., 1995, *Salmonella enteritidis colonization of the reproductive tract and forming and freshly laid eggs of chickens*. Infec. Immun. 63(7): 2443-2449).

The incidence of *Salmonella*, *E. coli* and *Enterococcus* varies depending on the type of ingredients used in animal feed manufacturing. There is higher incidence of *Salmonella* in rendered animal food (35%) than in plant-based food (5%). The incidence of *E. coli* is similar in both animals and plant derived foods (40%), but the incidence of *Enterococcus* is 80% in animal and 91% in plant-derived foods. The incidence of *Salmonella* contamination in animal feed is higher in mash form than in pellet form. Pelletization under high-temperature and high-pressure conditions reduces the number not only of *Salmonella* but also other bacteria. A problem with simple pelletization is that there is no protection against microbial recontamination of the feed before it is consumed by the animal, such as in bagging, transport and feeders.

The presence of scours in calves has economic importance. More than 90% of scours in calves is produced by *E. coli* and *Salmonella* and *Clostridia*. Preventive methods are known, such as (1) vaccination of the mothers in order to passively transfer antibodies in colostrum; (2) use of immune supplements for milk replacers; (3) use of probiotics to create a healthy environment in the gastro-intestinal tract, and (4) changes in husbandry. None of these protective measures are 100% effective.

The incidence of diarrhea in neonates and weaned piglets is also very high. Again, *E. coli* and *Salmonella* are the main microorganisms involved in diarrhea in swine. One of the preferred methods for preventing this problem is segregated early weaning (SEW). The basis of early weaning is that the earlier the piglets are weaned from the sow, the lesser the chances of crossover diseases between sow and piglets. In both calf and piglet scours, the preferred method of treatment is with antibiotics.

The European Community (EU) has banned the use of five antibiotics and FDA in the United States is banning the use of fluoroquinolone in animals due to the development of resistance to this antibiotic. Bacterial resistance has encouraged the development of antibiotic-alternative products. All the states of the EU have banned the use of antibiotics as growth promoters, and this has been extended to all countries that export meat or its derivatives to the EU.

Many products have been developed for the preservation of water and feed for animal uses, including water additives such as quaternary ammonium products, chlorite-based products, chlorination, chlorine dioxide, and organic acids (acetic, sorbate, ascorbic, citric, formic).

Methods for preservation of feed include heat treatment, organic acids, formaldehyde, essential oils and irradiation. The elimination of *Salmonella* with organic acids requires high levels of treatment, which implies high cost to the animal industry. Irradiation of feed is not cost effective and not consumer friendly. Sodium percabonate is a powerful oxidizer that is used as an antimicrobial in feed at levels of 1-2% of the diet.

Chlorate treatment is recommended for *E coli* and *Salmonella* since these bacteria have the enzyme nitrate reductase that reduces chlorate to chlorite, which has antimicrobial properties. *Salmonella*-challenged pigs when administered chlorate ions through water before slaughter had reduced bacteria counts in the intestine contents and lymph tissue (Anderson, R. C. et. al. 2004, *Effect of drinking-water administration of experimental chlorate ion preparations on Salmonella enterica serovar Typhimurium colonization in weaned and finished pigs*, Vet. Res. Comm. 28(3): 179-189).

Organic acids have been a major additive to reduce the incidence of food borne infections. The use of short-, medium- and long-chain fatty acids, e.g., formic, propionic, butyric, lactic, citric, malic and others have been reported to be successful in some instances. Short-chain fatty acids exert their antimicrobial activity because undissociated RCOOH (non-ionized) acid groups are lipid-permeable, and, therefore, can cross the microbial cell wall and dissociate in the more alkaline interior of the microorganism (RCOOH→RCOO$^-$+H$^+$) making the cytoplasm unstable for survival. The use of organic acids, especially formic and propionic acid, are well documented in the art. But pelargonic acid is referred to only as a herbicide and a fungicide for plant uses, not for preservation of water and animal feed.

Pelargonic acid is a naturally occurring fatty acid found in almost all species of animals and plants. Because it contains nine carbon atoms, it is also called nonanoic acid has the chemical formula $CH_3(CH_2)_7COOH$. It is found at low levels in many common foods and is readily broken down in the environment. It is an oily colorless fluid that solidifies at lower temperatures. It has an unpleasant rancid odor and is almost insoluble in water.

Pelargonic acid is used as a non-selective herbicide. Scythe (57% pelargonic acid, 3% related fatty acids and 40% inert material) is a broad-spectrum post-emergence or burn-down herbicide produced by Mycogen/Dow Chemicals. The herbicidal mode of action of pelargonic acid is due first to membrane leakage in the dark or light, and second to peroxidation driven by radicals formed in the light by sensitized chlorophyll displaced from the thylakoid membrane (B. Lederer, T. Fujimori., Y. Tsujino, K. Wakabayashi and P Boger; *Phytotoxic activity of middle-chain fatty acids II: peroxidation and membrane effects*. Pesticide Biochemistry and Physiology 80:151-156)

Chadeganipour and Haims (*Antifungal activities of pelargonic and capric acid on Microsporum gypseum* Mycoses Vol. 44, Number 3-4 pp 109-112, 2001) showed that the minimum inhibitory concentration (MTC) to prevent growth of *M. gypseum* on solid media was 0.02 mg/ml capric acid, and 0.04 mg/ml for pelargonic acid. In liquid media it was 0.075 mg/ml capric acid, and 0.05 mg/ml pelargonic. These acids were tested independently and not as a mixture.

N. Hirazawa, et al. (*Antiparasitic effect of medium-chain fatty acids against ciliated Crptocaryon irritans infestation in the red sea bream Pagrus major*, Aquaculture, 198:219-228, 2001) found that nonanoic acid as well as $C_6$ to $C_{10}$ fatty acids were effective in controlling the growth of the parasite *C. irritans* and that $C_8$, $C_9$ and $C_{10}$ were the more potent.

It was found that *Trichoderma harzianum*, a biocontrol for cacao plants, produces pelargonic acid as one of many chemicals, and was effective in controlling the germination and growth of cacao pathogens. (M. Aneja, T. Gianfagna and P. Hebbar, *Trichoderma harzianum produces nonanoic acid, an inhibitor of spore germination and mycelial growth of two cacao pathogens*, Physiological and Molecular Plant Pathology 67:304-307, 2005).

Published patent application US2004/0266852, discloses a fungicide for agricultural uses composed of one or more fatty acids and one or more organic acids different from the fatty acid. In the mixture of the organic acids with the fatty acid, the organic acid acts as a potent synergist for the fatty acid as a fungicide.

U.S. Pat. No. 5,366,995, discloses a method to eradicate fungal and bacterial infections in plants and to enhance the activity of fungicides and bactericides in plants by fatty acids and their derivatives with a formulation containing 80% pelargonic acid or its salts for the control of plants fungi. The fatty acids used primarily have 9 to 18 carbon chains.

U.S. Pat. No. 5,342,630 discloses a pesticide for plant uses containing an inorganic salt which enhances the efficacy of 8- to 22-carbon chain fatty acids. One of the examples shows a powder product with 2% pelargonic acid, 2% capric acid, 80% talc, 10% sodium carbonate and 5% potassium carbonate.

U.S. Pat. No. 5,093,124 discloses a fungicide and arthropodice for plants comprise of mono alpha carboxylic acids and their salts having a reduced phytotoxicity. Preferably a fungicide with 9 to 10 carbons chain at least, partially neutralized by active alkali metal such as potassium. The mixture comprises of 40% active ingredient dissolved in water and includes 10% pelargonic, 10% capric acid and 20% coconut fatty acids all of with are neutralized with potassium hydroxide.

U.S. Pat. No. 6,596,763 discloses a method to control skin infection comprised of 6- to 18-carbon chain fatty acids or their derivatives.

U.S. Pat. No. 6,103,768 and U.S. Pat. No. 6,136,856 disclose the unique utility of fatty acids and derivatives to eradicate existing fungal and bacterial infections in plants. This method is not preventive but showed effectiveness in established infections. Sharpshooter, a commercially available product, with 80% pelargonic acid, 2% emulsifier and 18% surfactant showed effectiveness against *Penicillium* and *Bonytis* spp.

U.S. Pat. No. 6,638,978 discloses an antimicrobial preservative composed of a glycerol fatty acid ester, a binary mixture of fatty acids (6 to 18 carbon chains) and a second fatty acid (6 to 18 carbon chains) wherein the second fatty acid is different from the first fatty acid, for preservation of food.

WO 01/97799 discloses the use of medium-chain fatty acids as antimicrobials agents. It shows that an increase in pH from 6.5 to 7.5 increased the MIC of the short-chain fatty acids containing 6-8 carbon chains.

Pelargonic acid is used as a component in food contact surface sanitizing solutions in food handling establishments. A product from EcoLab contains 6.49% pelargonic acid as active ingredient to be use as a sanitizer for all food contact surfaces (12 CFR 178.1010 b).

The FDA has cleared pelargonic acid as a synthetic food flavoring agent (21 CFR 172.515), as an adjuvant, production aid and sanitizer to be used in contact food (12 CFR 178.1010 b) and in washing or to assist in lye peeling of fruits and vegetables (12 CFR 173.315).

Pelargonic acid is listed by the USDA under the USDA list of Authorized Substances, 1990, section 5.14, Fruit and Vegetable Washing Compounds.

SUMMARY OF THE INVENTION

An object of the invention is to provide an antibacterial composition for extending the shelf-life of water, feed or feed ingredients, comprising: 1% to 99 wt. % of organic acids in aqueous solution, which is a $C_2$:$C_9$ or $C_3$:$C_9$ mixture of organic acids buffered to a pH=1-5; 0 to 20% by weight terpenes, and 0.5-10% surfactants; wherein the concentration of $C_9$ acid is 2 to 20 wt. %, based on the total organic acid content.

Another object of the invention is to provide a method for extending the shelf-life of water, feed or feed ingredients, comprising: spray-treating or admixing to water, feed or major feed ingredients, an effective amount of a composition comprising 1% to 99 wt. % of organic acids in aqueous solution, which is a $C_2$:$C_9$ or $C_3$:$C_9$ mixture of organic acids buffered to a pH=1-5; 0 to 20% by weight terpenes, and 0.5-10% surfactants; wherein the concentration of $C_9$ acid is 2 to 20 wt. %, based on the total organic acid content.

DETAILED DESCRIPTION OF THE INVENTION

Definitions:

An "organic acid" of the invention is a carboxylic acid compound having straight or branched $C_1$ to $C_{18}$ hydrocarbon chain, e.g., formic acid, acetic acid, propionic acid, butyric acid and pelargonic acid.

A "buffered solution" is one which resists changes in pH when small quantities of an acid or an alkali are added. Buffer capacity is a quantitative measure of the resistance of a buffer solution to pH change on addition of hydroxide ions. Buffering systems of the invention include HCl, Sodium citrate pH=1-5
Citric acid, Sodium citrate pH=2.5-5.6
Acetic acid, Sodium acetate pH=3.7-5.6
$NH_4Cl$, $NH_4OH$ pH 1 to 11

An "antimicrobial terpene" of the invention may be allyl disulfide, citral, pinene, nerol, geraniol, carvacrol, eugenol, carvone, anethole, camphor, menthol, limonene, farnesol, carotene, thymol, borneol, myrcene, terpenene, linalool, or mixtures thereof. Preferred terpenes are allyl disulfide, thymol, citral, eugenol, carvacrol, and carvone, or mixtures thereof.

The term "effective amount" of a compound means that amount which is capable of performing the function of the compound or property for which the effective amount is expressed, such as a non-toxic but sufficient amount to provide an antimicrobial effect. Thus an effective amount may be determined by one of ordinary skill in the art using routine experimentation.

Formulations can vary not only in the concentration of major components i.e. organic acids, but also in the type of terpenes, type of surfactant and water concentration used. The invention can be modified by adding or deleting terpenes and surfactants from the formulations.

The term "synergistic effect" or "synergy" means an improved preservative effect when the ingredients are used as a mixture compared to the expected additive effect based on each component used alone.

Compositions of the present invention comprise organic acids having 1 to 18 carbons, containing an effective amount of a $C_2$:$C_9$ or a $C_3$:$C_9$ mixture, resulting in a synergistic preservative effect. In general, an aqueous solution of the short-chain acids is buffered to a pH between 1 and 5, preferably between pH 1 and 3, then the $C_9$ (Pelargonic) acid is added in an amount from 2 to 20 wt. % along with optional terpenes and surfactants and other additives.

Antimicrobial terpenes, plant extracts or essential oils containing terpenes can be used in the invention as well as the more purified terpenes. Terpenes are commercially available or can be produced by various methods known in the art, such as solvent extraction or steam extraction/distillation or chemically synthesized.

The surfactant can be non-ionic, cationic, or anionic. Examples of surfactants include polysorbate 20, polysorbate 80, polysorbate 40, polysorbate 60, polyglyceryl ester, polyglyceryl monooleate, decaglyceryl monocaprylate, propylene glycol dicaprilate, triglycerol monostearate, Tween™ 20, Span™ 20, Span™ 40, Span™ 60, Span™ 80, ethoxylated castor oil surfactants or mixtures thereof.

The total composition can comprise 1% to 100% by weight organic acids, preferably 20-95%. Of the organic acid component, 2% to 20% by weight is pelargonic acid and the remaining 98% to 80% by weight is acetic acid, propionic acid or a mixture thereof. The composition may contain 0 to 20% by weight terpenes, preferably 0.5-10%, and 0 to 20% by weight surfactant, preferably 0.5-5%. The total composition may contain 0 to 99 wt. % water.

The present invention is effective against any of these classifications of infective agents present in water, feed and major feed ingredients, in particular, bacteria, mycoplasma, viruses and fungi. Examples of these infective agents are *Staphylococcus aureus, Aspergillius fumigatus, Mycoplasma iowae, Sclerotima homeocarpa, Rhizocionia solani, Colletotrichum graminicola, Penicilhun sp., Mycoplasma pneumoniae, E. coli, Salmonella sp., Clostridia sp., Campylobacter* sp. and others. The compositions and methods of the present invention are effective in preventing many, if not all, of these infections in a great variety of subjects, including humans, other mammals and avians.

The present invention includes a method to disinfect water, feed and feed ingredients. The method comprises administering the composition by a variety of means. For example, sprayed onto feed, sprayed onto water, mixed in drinking water, applied to surfaces where water and feed are stored for future uses or consumed daily, added drop wise through a standard medicator or water disinfector, for example in starter, grower and finisher animal houses.

The composition of the present invention can be used safely and effectively as a preservative for water and feed for all commercially grown animals, for human consumption and external use, for companion animals, and other animals where a low microbial concentration is desired in the feed or water supply.

Throughout this application, various publications are referenced. The disclosures of these publications are hereby incorporated by reference in their entireties into this application.

Example 1

Evaluation of Buffered Organic Acids

Purpose: To determine the Effect of pH on the Antimicrobial Activity of Acetic and Propionic Acid Treatments:
1) Control (negative control)
2) Formic acid:Propionic acid (90:10 ratio; positive control)
3) Acetic acid (pH 1)
4) Acetic acid (pH 2)
5) Acetic acid (pH 3)
6) Acetic acid (pH 4)
7) Acetic acid (pH 5)
8) Acetic acid (pH 6)
9) Acetic acid (pH 7)
10) Propionic acid (pH 1)
11) Propionic acid (pH 2)
12) Propionic acid (pH 3)
13) Propionic acid (pH 4)
14) Propionic acid (pH 5)
15) Propionic acid (pH 6)
16) Propionic acid (pH 7)

Procedure:
Propionic and acetic acids were buffered with ammonium hydroxide to pHs ranging from 1 to 7. Acid contents of the buffered solutions were determined by a weight to weight ratio calculation to obtain the same acid content in the test solutions. Solutions are added to sterile deionized water to provide a 0.025%, 0.05%, 0.075% and 0.1% acid solution. The pHs of the deionized water solutions were recorded and any problems with solubility noted.

100 ul of a nutrient broth culture of *Salmonella typhimurium* was added to each dilution tube. After addition, tubes were vortexed and allowed to stand. At 4 and 24 hours after addition of the inoculum, 100 ul of the solution was plated on Standard Plate agar (triplicate plates). Plates were incubated at 37° C. for 24 hours prior to enumeration. The minimum effective dose of each acid was determined by linear regression.

Results:

TABLE 1

Effect of pH Buffering on the Effectiveness of Acetic Acid against Salmonella

| Test Product | Product Conc. | 4 hr cfu/g | 4 hr % reduction | 24 hr cfu/g | 24 hr % reduction |
|---|---|---|---|---|---|
| Control | N/A | 1505 | 0 | 1180 | 0 |
| Formic acid:Propionic acid (90:10) | 0.025 | 203 | 87 | 0 | 100 |
| Formic acid:Propionic acid (90:10) | 0.05 | 50 | 97 | 0 | 100 |
| Formic acid:Propionic acid (90:10) | 0.075 | 20 | 99 | 0 | 100 |
| Formic acid:Propionic acid (90:10) | 0.1 | 3 | 100 | 0 | 100 |
| Acetic pH 1 | 0.025 | 883 | 41 | 107 | 91 |
| Acetic pH 1 | 0.05 | 750 | 50 | 7 | 99 |
| Acetic pH 1 | 0.075 | 617 | 59 | 17 | 99 |
| Acetic pH 1 | 0.1 | 520 | 65 | 7 | 99 |
| Acetic pH 2 | 0.025 | 920 | 39 | 170 | 86 |
| Acetic pH 2 | 0.05 | 817 | 46 | 50 | 96 |
| Acetic pH 2 | 0.075 | 673 | 55 | 20 | 98 |
| Acetic pH 2 | 0.1 | 670 | 55 | 17 | 99 |
| Acetic pH 3 | 0.025 | 1100 | 27 | 300 | 75 |
| Acetic pH 3 | 0.05 | 843 | 44 | 117 | 90 |
| Acetic pH 3 | 0.075 | 927 | 38 | 90 | 92 |
| Acetic pH 3 | 0.1 | 873 | 42 | 43 | 96 |
| Acetic pH 4 | 0.025 | 1067 | 29 | 543 | 54 |
| Acetic pH 4 | 0.05 | 1167 | 22 | 407 | 66 |
| Acetic pH 4 | 0.075 | 1097 | 27 | 263 | 78 |
| Acetic pH 4 | 0.1 | 1167 | 22 | 183 | 84 |
| Acetic pH 5 | 0.025 | 1267 | 16 | 993 | 16 |
| Acetic pH 5 | 0.05 | 1533 | 0 | 873 | 26 |
| Acetic pH 5 | 0.075 | 1367 | 9 | 805 | 32 |
| Acetic pH 5 | 0.1 | 1300 | 14 | 597 | 49 |
| Acetic pH 6 | 0.025 | 1500 | 0 | 1167 | 1 |
| Acetic pH 6 | 0.05 | 1767 | 0 | 1400 | 0 |
| Acetic pH 6 | 0.075 | 1667 | 0 | 1400 | 0 |
| Acetic pH 6 | 0.1 | 1633 | 0 | 1433 | 0 |
| Acetic pH 7 | 0.025 | 1567 | 0 | 1300 | 0 |
| Acetic pH 7 | 0.05 | 1600 | 0 | 1433 | 0 |
| Acetic pH 7 | 0.075 | 1467 | 2 | 1433 | 0 |
| Acetic pH 7 | 0.1 | 1567 | 0 | 1500 | 0 |

TABLE 2

Effect of pH Buffering on the Effectiveness of Propionic Acid against Salmonella

| Test Product | Product Conc. | 4 hr cfu/g | 4 hr % reduction | 24 hr cfu/g | 24 hr % reduction |
|---|---|---|---|---|---|
| Control | N/A | 1505 | 0 | 1180 | 0 |
| Formic acid:Propionic acid (90:10) | 0.025 | 203 | 87 | 0 | 100 |
| Formic acid:Propionic acid (90:10) | 0.05 | 50 | 97 | 0 | 100 |
| Formic acid:Propionic acid (90:10) | 0.075 | 20 | 99 | 0 | 100 |
| Formic acid:Propionic acid (90:10) | 0.1 | 3 | 100 | 0 | 100 |
| Propionic pH 1 | 0.025 | 1200 | 20 | 133 | 89 |
| Propionic pH 1 | 0.05 | 923 | 39 | 37 | 97 |
| Propionic pH 1 | 0.075 | 530 | 65 | 23 | 98 |
| Propionic pH 1 | 0.1 | 450 | 70 | 10 | 99 |
| Propionic pH 2 | 0.025 | 1067 | 29 | 70 | 94 |
| Propionic pH 2 | 0.05 | 733 | 51 | 10 | 99 |
| Propionic pH 2 | 0.075 | 477 | 68 | 13 | 99 |
| Propionic pH 2 | 0.1 | 380 | 75 | 7 | 99 |
| Propionic pH 3 | 0.025 | 1467 | 2 | 190 | 84 |
| Propionic pH 3 | 0.05 | 847 | 44 | 83 | 93 |
| Propionic pH 3 | 0.075 | 973 | 35 | 60 | 95 |
| Propionic pH 3 | 0.1 | 603 | 60 | 27 | 98 |
| Propionic pH 4 | 0.025 | 1367 | 9 | 615 | 48 |
| Propionic pH 4 | 0.05 | 1200 | 20 | 293 | 75 |
| Propionic pH 4 | 0.075 | 943 | 37 | 187 | 84 |
| Propionic pH 4 | 0.1 | 1167 | 22 | 163 | 86 |
| Propionic pH 5 | 0.025 | >1505 | 0 | 793 | 33 |
| Propionic pH 5 | 0.05 | 1400 | 7 | 943 | 20 |
| Propionic pH 5 | 0.075 | 1167 | 22 | 630 | 47 |
| Propionic pH 5 | 0.1 | 817 | 46 | 557 | 53 |
| Propionic pH 6 | 0.025 | >1505 | 0 | 1450 | 0 |

TABLE 2-continued

Effect of pH Buffering on the Effectiveness of Propionic Acid against Salmonella

| Test Product | Product Conc. | Salmonella at time Interval | | | |
|---|---|---|---|---|---|
| | | 4 hr | | 24 hr | |
| | | cfu/g | % reduction | cfu/g | % reduction |
| Propionic pH 6 | 0.05 | 1400 | 7 | 1067 | 10 |
| Propionic pH 6 | 0.075 | >1505 | 0 | 1233 | 0 |
| Propionic pH 6 | 0.1 | 1700 | 0 | 1333 | 0 |
| Propionic pH 7 | 0.025 | >1505 | 0 | 1667 | 0 |
| Propionic pH 7 | 0.05 | 1700 | 0 | 1367 | 0 |
| Propionic pH 7 | 0.075 | >1505 | 0 | 1700 | 0 |
| Propionic pH 7 | 0.1 | 1600 | 0 | 1367 | 0 |

TABLE 3

Minimum Inhibitory Concentrations

| Treatment | MIC at 4 Hr | MIC at 24 HR |
|---|---|---|
| Formic:Propionic | 0.067 | <0.025 |
| Acetic, pH 1 | 0.129 | 0.065 |
| Acetic, pH 2 | 0.142 | 0.067 |
| Acetic, pH 3 | 0.176 | 0.073 |
| Acetic, pH 4 | 0.207 | 0.096 |
| Acetic, pH 5 | 0.238 | 0.210 |
| Acetic, pH 6 | ND | ND |
| Acetic, pH 7 | ND | ND |
| Propionic, pH 1 | 0.131 | 0.066 |
| Propionic, pH 2 | 0.120 | 0.064 |
| Propionic, pH 3 | 0.149 | 0.069 |
| Propionic, pH 4 | 0.237 | 0.091 |
| Propionic, pH 5 | 0.170 | 0.165 |
| Propionic, pH 6 | ND | ND |
| Propionic, pH 7 | ND | ND |

ND—MIC can not be determined due to a lack of effect at the highest dose rate.

Conclusions: Buffering of acetic or propionic acid with ammonia decreased the effectiveness of the product to *Salmonella*. The break point appears to be between a pH of 3-4.

Example 2

Evaluation of Individual Organic Acids

Purpose: To Determine the Effect of Carbon Chain Length of Organic Acids on Antimicrobial Activity
Treatments:
1) Control
2) Formic acid:Propionic acid (90:10 ratio; positive control)
3) Formic acid
4) Acetic acid
5) Propionic acid
6) Butyric acid
7) Valeric acid
8) Caproic acid
9) Oenanthic acid
10) Caprylic acid
11) Pelargonic acid
12) Lauric acid
13) Potassium hydroxide Procedure:

In this experiment, the effect of free fatty acids was evaluated. Several long chain fatty acids (caprylic, pelargonic and lauric) were not soluble in water and KOH was used to get these acids into solution in water (final solution contained equal amounts by weights of acid and KOH. Acid content of the solutions was determined by a weight to weight ratio calculation (weight of acid/total weight of buffered solution). Solutions are added to sterile deionized water to provide a 0.025%, 0.05%, 0.075% and 0.1% acid solutions. The pH of the deionized water solutions was recorded and any problems with solubility noted 100 ul of a nutrient broth culture of *Salmonella typhimurium* was added to each dilution tube. After addition, tubes were vortexed and allowed to stand. At 4 and 24 hours after addition of the inoculum, 100 ul of the solution was plated on agar (triplicate plates). Plates were incubated at 37° C. for 24 hours prior to enumeration. The minimum effective dose of each acid was be determined by linear regression:

TABLE 4

Effect of Organic Acids against Salmonella

| Test Product | Product Conc. | Salmonella at time Interval | | | |
|---|---|---|---|---|---|
| | | 4 hr | | 24 hr | |
| | | cfu/g | % reduction | cfu/g | % reduction |
| Control | | 1600 | 0 | 1700 | 0 |
| Formic acid:Propionic acid (90:10) | 0.025 | 160 | 90 | 0 | 100 |
| Formic acid:Propionic acid (90:10) | 0.05 | 20 | 99 | 0 | 100 |

TABLE 4-continued

Effect of Organic Acids against Salmonella

| | | Salmonella at time Interval | | | |
|---|---|---|---|---|---|
| | Product | 4 hr | | 24 hr | |
| Test Product | Conc. | cfu/g | % reduction | cfu/g | % reduction |
| Formic acid:Propionic acid (90:10) | 0.075 | 0 | 100 | 0 | 100 |
| Formic acid:Propionic acid (90:10) | 0.1 | 0 | 100 | 0 | 100 |
| Formic acid | 0.025 | 83 | 95 | 0 | 100 |
| Formic acid | 0.05 | 7 | 100 | 0 | 100 |
| Formic acid | 0.075 | 0 | 100 | 0 | 100 |
| Formic acid | 0.1 | 0 | 100 | 0 | 100 |
| Acetic acid | 0.025 | 917 | 43 | 80 | 95 |
| Acetic acid | 0.05 | 840 | 48 | 13 | 99 |
| Acetic acid | 0.075 | 677 | 58 | 10 | 99 |
| Acetic acid | 0.1 | 513 | 68 | 15 | 99 |
| Propionic acid | 0.025 | 1167 | 27 | 170 | 90 |
| Propionic acid | 0.05 | 900 | 44 | 40 | 98 |
| Propionic acid | 0.075 | 877 | 45 | 25 | 99 |
| Propionic acid | 0.1 | 773 | 52 | 30 | 98 |
| Butyric acid | 0.025 | 1060 | 34 | 170 | 90 |
| Butyric acid | 0.05 | 833 | 48 | 57 | 97 |
| Butyric acid | 0.075 | 977 | 39 | 30 | 98 |
| Butyric acid | 0.1 | 547 | 66 | 10 | 99 |
| Valeric acid | 0.025 | 1233 | 23 | 533 | 69 |
| Valeric acid | 0.05 | 1267 | 21 | 73 | 96 |
| Valeric acid | 0.075 | 990 | 38 | 37 | 98 |
| Valeric acid | 0.1 | 657 | 59 | 17 | 99 |
| Caproic acid | 0.025 | 1267 | 21 | 30 | 98 |
| Caproic acid | 0.05 | 1433 | 10 | 7 | 100 |
| Caproic acid | 0.075 | 523 | 67 | 0 | 100 |
| Caproic acid | 0.1 | 27 | 98 | 0 | 100 |
| Oenanthic acid | 0.025 | 1103 | 31 | 10 | 99 |
| Oenanthic acid | 0.05 | 0 | 100 | 0 | 100 |
| Oenanthic acid | 0.075 | 0 | 100 | 0 | 100 |
| Oenanthic acid | 0.1 | 0 | 100 | 0 | 100 |
| Caprylic acid/KOH | 0.025 | 1567 | 2 | 1400 | 18 |
| Caprylic acid/KOH | 0.05 | 1333 | 17 | 797 | 53 |
| Caprylic acid/KOH | 0.075 | 1100 | 31 | 77 | 95 |
| Caprylic acid/KOH | 0.1 | 0 | 100 | 0 | 100 |
| Pelargonic acid/KOH | 0.025 | 7 | 100 | 0 | 100 |
| Pelargonic acid/KOH | 0.05 | 0 | 100 | 0 | 100 |
| Pelargonic acid/KOH | 0.075 | 0 | 100 | 0 | 100 |
| Pelargonic acid/KOH | 0.1 | 0 | 100 | 0 | 100 |
| Lauric acid/KOH | 0.025 | 670 | 58 | 20 | 99 |
| Lauric acid/KOH | 0.05 | 0 | 100 | 0 | 100 |
| Lauric acid/KOH | 0.075 | 0 | 100 | 0 | 100 |
| Lauric acid/KOH | 0.1 | 0 | 100 | 0 | 100 |
| KOH | 0.025 | 0 | 100 | 0 | 100 |
| KOH | 0.05 | 0 | 100 | 0 | 100 |
| KOH | 0.075 | 0 | 100 | 0 | 100 |
| KOH | 0.1 | 0 | 100 | 0 | 100 |

TABLE 5

Minimum Inhibitory Concentration of Organic Acids against Salmonella

| Treatment | MIC at 4 HR | MIC at 24 FIR |
|---|---|---|
| Formic acid:Propionic acid | 0.065 | <0.025 |
| Formic acid | 0.064 | <0.025 |
| Acetic acid | 0.129 | 0.064 |
| Propionic acid | 0166 | 0.066 |
| Butyric acid | 0.142 | 0.066 |
| Valeric acid | 0.174 | 0.070 |
| Caproic acid | 0.103 | 0.063 |
| Oenanthic acid | 0.075 | 0.063 |
| Caprylic acid | 0.109 | 0.090 |
| Pelargonic acid | 0.063 | <0.025 |
| Lauric acid | 0.072 | <0.025 |
| Potassium hydroxide | <0.025 | <0.025 |

Conclusions: No direct relationship was observed to occur between the efficacy against *Salmonella* and organic acid chain length. This contrasts the effects reported for acid chain length and anti-fungal efficacy. The activity of caprylic, pelargonic and lauric can not be compared to the shorter chain acids due to the use of KOH.

Example 3

Buffered Organic Acids Mixtures

Purpose: Of the long chain organic acids, pelargonic was observed to be the most effective based on prior studies. This experiment is to determine if there is a synergistic effect when buffered propionic or acetic acid is combined with pelargonic acid.
Test Products:
  1) Control
  2) Formic acid : Propionic acid (90:10 ratio; positive control)
  3) Acetic acid
  4) Acetic acid: pelargonic acid (80:20: wt/wt)

5) Acetic acid: pelargonic acid (60:40: wt/wt)
6) Acetic acid: pelargonic acid (40:60: wt/wt)
7) Acetic acid: pelargonic acid (20:80: wt/wt)
8) Propionic acid
9) Propionic acid: pelargonic acid (80:20: wt/wt)
10) Propionic acid: pelargonic acid (60:40: wt/wt)
11) Propionic acid: pelargonic acid (40:60: wt/wt)
12) Propionic acid: pelargonic acid (20:80: wt/wt)
13) Pelargonic acid Procedure: Propionic and acetic acids were buffered with ammonium hydroxide to a pH of 3 and combined with pelargonic in the ratios above. Acid content of the buffered solutions was determined by weight to weight ratio calculation (weight of acid/total weight of buffered solution) and adjusted to provide an equal acid value for each treatment. The treatments above were added to sterile deionized water to make at a 0.025%, 0.05%, 0.075% and 0.1% total acid solutions. The pHs of the deionized water solutions were recorded and any problems with solubility noted.

100 ul of a nutrient broth culture of *Salmonella typhimurium* was added to each dilution tube. After addition, tubes were vortexed and allowed to stand. At 4 and 24 hours after addition of the inoculum, 100 ul of the solution was plated on Standard Plate agar (triplicate plates). Plates were incubated at 37° C. for 24 hours prior to enumeration. The minimum effective dose of each acid was determined by linear regression.

TABLE 6

Effect of Pelargonic acid on the effectiveness of acetic or propionic against Salmonella

| Test Product | Product Conc. | Salmonella at time Interval | | | |
|---|---|---|---|---|---|
| | | 4 hr | | 24 hr | |
| | | cfu/g | % reduction | cfu/g | % reduction |
| Control | N/A | 1517 | 0 | 1344 | 0 |
| Formic acid:Propionic acid (90:10) | 0.025 | 200 | 87 | 0 | 100 |
| | 0.05 | 67 | 96 | 0 | 100 |
| | 0.075 | 20 | 99 | 2 | 100 |
| | 0.1 | 10 | 99 | 0 | 100 |
| 100% Propionic pH 3 | 0.025 | 1133 | 25 | 70 | 95 |
| | 0.05 | 880 | 42 | 17 | 99 |
| | 0.075 | 1133 | 25 | 20 | 99 |
| | 0.1 | 857 | 44 | 13 | 99 |
| 80% Propionic pH 3:20% Pelargonic | 0.025 | 0 | 100 | 3 | 100 |
| | 0.05 | 0 | 100 | 0 | 100 |
| | 0.075 | 0 | 100 | 3 | 100 |
| | 0.1 | 0 | 100 | 0 | 100 |
| 60% Propionic pH 3:40% Pelargonic | 0.025 | 0 | 100 | 0 | 100 |
| | 0.05 | 0 | 100 | 0 | 100 |
| | 0.075 | 0 | 100 | 3 | 100 |
| | 0.1 | 0 | 100 | 0 | 100 |
| 40% Propionic pH 3:60% Pelargonic | 0.025 | 0 | 100 | 0 | 100 |
| | 0.05 | 0 | 100 | 0 | 100 |
| | 0.075 | 0 | 100 | 3 | 100 |
| | 0.1 | 0 | 100 | 0 | 100 |
| 20% Propionic pH 3:80% Pelargonic | 0.025 | 0 | 100 | 0 | 100 |
| | 0.05 | 0 | 100 | 0 | 100 |
| | 0.075 | 0 | 100 | 3 | 100 |
| | 0.1 | 0 | 100 | 0 | 100 |
| 100% Acetic pH 3 | 0.025 | 943 | 38 | 123 | 92 |
| | 0.05 | 1007 | 34 | 120 | 92 |
| | 0.075 | 1007 | 34 | 77 | 95 |
| | 0.1 | 967 | 36 | 83 | 95 |
| 80% Acetic pH 3:20% Pelargonic | 0.025 | 0 | 100 | 0 | 100 |
| | 0.05 | 0 | 100 | 0 | 100 |
| | 0.075 | 0 | 100 | 3 | 100 |
| | 0.1 | 0 | 100 | 0 | 100 |
| 60% Acetic pH 3:40% Pelargonic | 0.025 | 0 | 100 | 0 | 100 |
| | 0.05 | 0 | 100 | 0 | 100 |
| | 0.075 | 0 | 100 | 3 | 100 |
| | 0.1 | 0 | 100 | 0 | 100 |
| 40% Acetic pH 3:60% Pelargonic | 0.025 | 0 | 100 | 0 | 100 |
| | 0.05 | 0 | 100 | 0 | 100 |
| | 0.075 | 0 | 100 | 3 | 100 |
| | 0.1 | 0 | 100 | 0 | 100 |
| 20% Acetic pH 3:80% Pelargonic | 0.025 | 0 | 100 | 0 | 100 |
| | 0.05 | 0 | 100 | 0 | 100 |
| | 0.075 | 0 | 100 | 0 | 100 |
| | 0.1 | 0 | 100 | 0 | 100 |
| Pelargonic | 0.025 | 0 | 100 | 0 | 100 |
| | 0.05 | 0 | 100 | 0 | 100 |
| | 0.075 | 0 | 100 | 0 | 100 |
| | 0.1 | 0 | 100 | 0 | 100 |

TABLE 7

Minimum Inhibitory Concentration of Pelargonic when mixed with acetic or propionic acid

| Treatment | MIC at 4 HR | MIC at 24 HR |
|---|---|---|
| Formic acid:Propionic acid | 0.067 | <0.025 |
| Propionic acid | 0.179 | 0.064 |
| Propionic acid:pelargonic acid (80:20) | <0.025 | 0.063 |
| Propionic acid:pelargonic acid (60:40) | <0.025 | <0.025 |
| Propionic acid:pelargonic acid (40:60) | <0.025 | <0.025 |
| Propionic acid:pelargonic acid (20:80) | <0.025 | <0.025 |
| Acetic acid | 0.171 | 0.068 |
| Acetic acid:pelargonic acid (80:20) | <0.025 | <0.025 |
| Acetic acid:pelargonic acid (60:40) | <0.025 | <0.025 |
| Acetic acid:pelargonic acid (40:60) | <0.025 | <0.025 |
| Acetic acid:pelargonic acid (20:80) | <0.025 | <0.025 |
| Pelargonic acid | <0.025 | <0.025 |

Conclusion: The addition of pelargonic acid to propionic or acetic acid resulted in an increase in efficacy.

Study 4

Propionic and acetic acids were buffered with ammonium hydroxide to a pH of 3 and combined with pelargonic in the ratios listed. Acid content of the buffered solutions was determined by weight to weight ratio calculation (weight of acid/total weight of buffered solution) and adjusted to provide an equal acid value for each treatment. The treatments above were added to sterile deionized water to make at a 0.025% and 0.05% total acid solutions. The pHs of the deionized water solutions were recorded and any problems with solubility noted.

100 ul of a nutrient broth culture of *Salmonella typhimurium* was added to each dilution tube. After addition, tubes were vortexed and allowed to stand. At 4 and 24 hours after addition of the inoculum, 100 ul of the solution was plated on Standard Plate agar (triplicate plates). Plates were incubated at 37° C. for 24 hours prior to enumeration.

TABLE 8

Effect of Pelargonic acid on the effectiveness of acetic or propionic against Salmonella

| | | Salmonella at time Interval | | | |
|---|---|---|---|---|---|
| | Product | 4 hr | | 24 hr | |
| Test Product | Concentration | (cfu/g) | % reduction | (cfu/g) | % reduction |
| Formic acid:Propionic acid (90:10) | 0.025 | 600 | 57 | <10 | 100 |
| | 0.05 | 170 | 88 | <10 | 100 |
| 100% Propionic pH 3 | 0.025 | 990 | 29 | 130 | 91 |
| | 0.05 | 1000 | 29 | 50 | 96 |
| 99% Propionic pH 3:1% Pelargonic | 0.025 | 1100 | 21 | 100 | 93 |
| | 0.05 | 620 | 56 | <10 | 100 |
| 98% Propionic pH 3:2% Pelargonic | 0.025 | 1100 | 21 | 60 | 96 |
| | 0.05 | 560 | 60 | <10 | 100 |
| 95% Propionic pH 3:5% Pelargonic | 0.025 | 780 | 44 | <10 | 100 |
| | 0.05 | 50 | 96 | <10 | 100 |
| 90% Propionic pH 3:10% Pelargonic | 0.025 | 220 | 84 | <10 | 100 |
| | 0.05 | <10 | 100 | <10 | 100 |
| 80% Propionic pH 3:20% Pelargonic | 0.025 | <10 | 100 | <10 | 100 |
| | 0.05 | <10 | 100 | <10 | 100 |
| 100% Acetic pH 3 | 0.025 | 1000 | 29 | 60 | 96 |
| | 0.05 | 950 | 32 | 20 | 99 |
| 99% Acetic pH 3:1% Pelargonic | 0.025 | 1200 | 14 | 90 | 94 |
| | 0.05 | 820 | 41 | <10 | 100 |
| 98% Acetic pH 3:2% Pelargonic | 0.025 | 1100 | 21 | 40 | 97 |
| | 0.05 | 710 | 49 | <10 | 100 |
| 95% Acetic pH 3:5% Pelargonic | 0.025 | 690 | 51 | <10 | 100 |
| | 0.05 | 40 | 97 | <10 | 100 |
| 90% Acetic pH 3:10% Pelargonic | 0.025 | 280 | 80 | <10 | 100 |
| | 0.05 | <10 | 100 | <10 | 100 |
| 80% Acetic pH 3:20% Pelargonic | 0.025 | <10 | 100 | <10 | 100 |
| | 0.05 | <10 | 100 | <10 | 100 |
| Control | | 1400 | | 1400 | |

Conclusion: The addition of pelargonic acid (1-20%) to propionic or acetic acid resulted in an increase in efficacy against *salmonella*.

Study 5

Propionic, acetic and pelargonic acids by themselves or in combination as listed were added to sterile deionized water to make at a 0.05%, 0.04%, 0.03%, 0.02% and 0.01% total acid solutions. The pHs of the deionized water solutions were recorded and any problems with solubility noted. 100 ul of a nutrient broth culture of *Salmonella typhimurium* was added to each dilution tube. After addition, tubes were vortexed and allowed to stand. At 24 hours after addition of the inoculum, 100 ul of the solution was plated on Standard Plate agar (triplicate plates). Plates were incubated at 37° C. for 24 hours prior to enumeration.

TABLE 9

Effect of Pelargonic acid on the effectiveness of acetic or propionic against Salmonella

| Test Product (%) | Salmonella 24 hr afterTreatment (cfu/g) | | | | |
|---|---|---|---|---|---|
| | 0.05 | 0.04 | 0.03 | 0.02 | 0.01 |
| Formic acid:Propionic acid (90:10) | 0 | 10 | 20 | 60 | 500 |
| Pelargonic Acid | 850 | 1500 | UD | 1300 | 1400 |
| Propionic Acid | 560 | 910 | 810 | 870 | 1200 |
| Acetic Acid | 1100 | 1100 | UD | 1100 | UD |
| Prop/Pelargonic (95/5) | 0 | 30 | 240 | 360 | 1400 |
| Acetic/Pelargonic (95/5) | 20 | 130 | UD | 940 | 1100 |
| Control | 1400 | | | | |

UD = Unable to determine

Conclusion: Test showed increased efficacy by mixing Propionic/Pelargonic (95/5) and Acetic/Pelargonic (95/5) 24 hours after treatment.

Study 6

Capric acid (5%, 10% or 20%) diluted in acetic acid or propionic acid was tested to determine its effectiveness against salmonella in feed.

Commercial poultry feed amended with *Salmonella typhimurium* was treated with 1 or 3 kg/MT of the solutions listed below. Twenty four hours after treatment, 10 gr of feed was added to 90 ml Butterfield buffer, mixed and then 100 ul of the solution was plated on Standard Plate agar (triplicate plates). Plates were incubated at 37° C. for 24 hours prior to enumeration.

TABLE 10

Effect of Capric/Acetic acids against Salmonella in feed.

| Treatment | cfu/g | % Reduction |
|---|---|---|
| Control | 5733 | |
| Formic:Acetic (1 kg/ton) | 17 | 99.7 |
| Acetic Acid (1 kg/ton) | 3367 | 41.3 |
| Acetic Acid (3 kg/ton) | 2600 | 54.6 |
| 5% Capric in acetic acid (1 kg/ton) | 3200 | 44.2 |
| 5% Capric in acetic acid (3 kg/ton) | 3733 | 34.9 |
| 10% Capric in acetic acid (1 kg/ton) | 3233 | 43.6 |
| 10% Capric in acetic acid (3 kg/ton) | 2900 | 49.4 |
| 20% Capric in acetic acid (1 kg/ton) | 3200 | 44.2 |
| 20% Capric in acetic acid (3 kg/ton) | 4500 | 21.5 |

TABLE 11

Effect of Capric/Propionic acids against Salmonella in feed.

| Treatment | cfu/g | % Reduction |
|---|---|---|
| Control | 4500 | |
| Formic:Prop 1 kg/ton | 4100 | 8.9 |
| Formic:Prop 3 kg/ton | 2067 | 54.1 |
| Prop Acid 1 kg/ton | 4633 | 0 |
| Prop Acid 3 kg/ton | 5633 | 0 |
| 5% Capric in propionic acid 1 kg/ton | 3233 | 28.2 |
| 5% Capric in propionic acid 3 kg/ton | 3400 | 24.4 |
| 10% Capric in propionic acid 1 kg/ton | 2367 | 47.4 |
| 10% Capric in propionic acid 3 kg/ton | 4033 | 10.4 |
| 20% Capric in propionic acid 1 kg/ton | 4067 | 9.6 |
| 20% Capric in propionic acid 3 kg/ton | 3700 | 17.8 |

Addition of capric acid to acetic or propionic acid at concentrations of 5-20% did not appear to significantly improve the efficacy of the organic acid against *Salmonella* in feed.

Study 7

Myristic acid (5%, 10% and 20%) diluted in propionic acid was tested to determine its effectiveness against salmonella in feed. Myristic acid was not soluble in acetic acid.

Commercial poultry feed amended with *Salmonella typhimurium* was treated with 1 or 3 kg/MT of the solutions listed below. Twenty four hours after treatment, 10 gr of feed was added to 90 ml Butterfield buffer, mixed and then 100 ul of the solution was plated on Standard Plate agar (triplicate plates). Plates were incubated at 37° C. for 24 hours prior to enumeration.

TABLE 12

Effect of Myristic/Propionic acids against Salmonella in feed.

| Treatment | cfu/g | % Reduction |
|---|---|---|
| Control | 40000 | — |
| Formic:Prop 1 kg/MT | 23533 | 41.17 |
| Formic:Prop 3 kg/MT | 7167 | 82.08 |
| Prop acid 1 kg/MT | 3967 | 90.08 |
| Prop acid 3 kg/MT | 233 | 99.42 |
| 5% Myristic in propionic acid 1 kg/MT | 7767 | 80.58 |
| 5% Myristic in propionic acid 3 kg/MT | 1500 | 69.25 |
| 10% Myristic in propionic acid 1 kg/MT | 22567 | 43.58 |
| 10% Myristic in propionic acid 3 kg/MT | 23333 | 41.67 |
| 20% Myristic in propionic acid 1 kg/MT | 22667 | 43.33 |
| 20% Myristic in propionic acid 3 kg/MT | 22967 | 42.58 |

No beneficial effect in efficacy was observed when myristic acid was added at 5-20% to propionic acid compared to the standard propionic acid combination.

Study 8

Lauric acid (5%, 10%, 20%) diluted with propionic acid was tested to determine its effectiveness against salmonella in feed.

Commercial poultry feed amended with *Salmonella typhimurium* was treated with 1 or 2 kg/MT of the solutions listed below. Twenty four hours after treatment, 10 gr of feed was added to 90 ml Butterfield buffer, mixed and then 100 ul of the solution was plated on Standard Plate agar (triplicate plates). Plates were incubated at 37° C. for 24 hours prior to enumeration.

TABLE 13

Effect of Lauric/Propionic acids against Salmonella in feed.

| Treatment | cfu/g | % Reduction |
|---|---|---|
| Control | 33333 | — |
| Formic:Prop 1 kg/MT | 24633 | 26.1 |
| Formic:Prop 3 kg/MT | 10500 | 68.5 |
| Prop Acid 1 kg/MT | 2567 | 92.3 |
| Prop Acid 3 kg/MT | 0 | 100.0 |
| 5% Lauric in propionic acid 1 kg/MT | 8767 | 73.7 |
| 5% Lauric in propionic acid 3 kg/MT | 433 | 98.7 |
| 10% Lauric in propionic acid 1 kg/MT | 7800 | 76.6 |
| 10% Lauric in propionic acid 3 kg/MT | 833 | 97.5 |
| 20% Lauric in propionic acid 1 kg/MT | 9100 | 72.7 |
| 20% Lauric in propionic acid 3 kg/MT | 2333 | 93.0 |

No beneficial effect was observed when lauric acid (5-20%) was added to propionic acid compared to the standard propionic acid combination.

It will be apparent to those skilled in the art that a number of modifications and variations may be made in the present invention without departing from the scope of the invention. It is intended that the specification and examples be considered as exemplary only, with a true scope and spirit of the invention being indicated by the following claims.

The invention claimed is:

1. An antimicrobial composition for extending the shelf-life of water, feed or feed ingredients, against *Salmonella*, the antimicrobial composition comprising an organic carboxylic acids (RCOOH) aqueous solution that comprises:
   a buffered short-chain acid aqueous solution having a pH in a range of 1-5, wherein the buffered short-chain acid aqueous solution comprises a buffering agent and a short-chain acid, wherein the short-chain acid is at a concentration in a range of 80 to 95 wt. % of the total organic carboxylic acid content in the organic carboxylic acids aqueous solution, and wherein the short-chain acid is propionic acid, and wherein the buffering agent is ammonium hydroxide; and
   pelargonic acid ($CH_3(CH_2)_7COOH$) at a concentration in a range of 5 to 20 wt. % of the total organic carboxylic acid content in the organic carboxylic acids aqueous solution.

2. The antimicrobial composition of claim 1, wherein the buffered short-chain acid aqueous solution has a pH in a range of 1-3.

3. The antimicrobial composition of claim 1 further comprising a surfactant at a concentration not greater than 20 wt. % of the antimicrobial composition, wherein the surfactant is selected from the group consisting of polysorbate 20, polysorbate 80, polysorbate 40, polysorbate 60, polyglyceryl ester, polyglyceryl monooleate, decaglyceryl monocaprylate, propylene glycol dicaprilate, triglycerol monostearate, sorbitane monooleate, ethoxylated castor oil surfactants, and mixtures thereof.

4. The antimicrobial composition of claim 3, wherein the surfactant is at a concentration that is in a range of 0.5 to 5 wt. % of the antimicrobial composition.

5. The antimicrobial composition of claim 1 further comprising a terpene at a concentration not greater than 20 wt. % of the antimicrobial composition, wherein the terpene is selected from the group consisting of allyl disulfide, citral, pinene, nerol, geraniol, carvacrol, eugenol, carvone, anethole, camphor, menthol, limonene, farnesol, carotene, thymol, borneol, myrcene, terpenene, linalool, and mixtures thereof.

6. The antimicrobial composition of claim 5, wherein the terpene is selected from the group consisting of allyl disulfide, thymol, citral, eugenol, carvacrol, carvone, and mixtures thereof.

7. The antimicrobial composition of claim 6, wherein the terpene concentration is in a range of 0.5-10 wt. % of the antimicrobial composition.

8. A method for extending the shelf-life of water, feed or feed ingredients, against *Salmonella*, the method comprising spray-treating or admixing to the water, feed or feed ingredients an effective amount of an antimicrobial composition that comprises an organic carboxylic acids (RCOOH) aqueous solution, wherein the organic carboxylic acids aqueous solution comprises:
   a buffered short-chain acid aqueous solution having a pH in a range of 1-5, wherein the buffered short-chain acid aqueous solution comprises a buffering agent and a short-chain acid, wherein the short-chain acid is at a concentration in a range of 80 to 95 wt. % of the total organic carboxylic acid content in the organic carboxylic acids aqueous solution, and wherein the short-chain acid is propionic acid, and wherein the buffering agent is ammonium hydroxide; and
   pelargonic acid ($CH_3(CH_2)_7COOH$) at a concentration in a range of about 5 to about 20 wt. % of the total organic carboxylic acid content in the organic carboxylic acids aqueous solution.

9. The method of claim 8, wherein the buffered short-chain acid aqueous solution has a pH in a range of 1-3.

10. The method of claim 8, wherein the antimicrobial composition further comprises a surfactant at a concentration not greater than 20 wt. % of the antimicrobial composition, wherein the surfactant is selected from the group consisting of polysorbate 20, polysorbate 80, polysorbate 40, polysorbate 60, polyglyceryl ester, polyglyceryl monooleate, decaglyceryl monocaprylate, propylene glycol dicaprilate, triglycerol monostearate, sorbitane monooleate, ethoxylated castor oil surfactants, and mixtures thereof.

11. The method of claim 10, wherein the surfactant is at a concentration that is in a range of 0.5 to 5 wt. % of the antimicrobial composition.

12. The method of claim 8, wherein antimicrobial composition further comprises a terpene at a concentration not greater than 20 wt. % of the antimicrobial composition, wherein the terpene is selected from the group consisting of allyl disulfide, citral, pinene, nerol, geraniol, carvacrol, eugenol, carvone, anethole, camphor, menthol, limonene, farnesol, carotene, thymol, borneol, myrcene, terpenene, linalool, and mixtures thereof.

13. The method of claim 12, wherein the terpene is selected from the group consisting of allyl disulfide, thymol, citral, eugenol, carvacrol, carvone, and mixtures thereof.

14. The method of claim 13, wherein the terpene concentration is in a range of 0.5-10 wt. % of the antimicrobial composition.

15. The method of claim 8, wherein said antimicrobial composition contains 20% to 90 wt. % of said organic carboxylic acids (RCOOH) in aqueous solution.

16. The antimicrobial composition of claim 1, wherein said organic carboxylic acids (RCOOH) in aqueous solution is 20% to 90 wt. % of the antimicrobial composition.

17. An antimicrobial composition for extending the shelf-life of water, feed or feed ingredients, against *Salmonella*, the antimicrobial composition comprising:
   (a) an organic carboxylic acids (RCOOH) aqueous solution having a total organic carboxylic acid content that is in a range of 20 to 95 wt. % of the antimicrobial composition, wherein the organic carboxylic acids (RCOOH) aqueous solution comprises:
(i) a buffered short-chain acid aqueous solution having a pH in a range of 1-3, wherein the buffered short-chain acid aqueous solution comprises a buffering agent and a short-chain acid, wherein the short-chain acid is at a concentration in a range of 80 to 95 wt. % of the total organic carboxylic acid content in the organic carboxylic acids aqueous solution, and wherein the short-chain acid is propionic acid, and wherein the buffering agent is ammonium hydroxide; and
(ii) pelargonic acid ($CH_3(CH_2)_7COOH$) at a concentration in a range of 5 to 20 wt. % of the total organic carboxylic acid content in the organic carboxylic acids aqueous solution;
(b) a terpene at a concentration in a range of 0.5 to 20 wt. % of the antimicrobial composition, wherein the terpene is selected from the group consisting of allyl disulfide, citral, pinene, nerol, geraniol, carvacrol, eugenol, carvone, anethole, camphor, menthol, limonene, farnesol, carotene, thymol, borneol, myrcene, terpenene, linalool, and mixtures thereof; and
(c) a surfactant at a concentration that is in a range of 0.5 to 20 wt. % of the antimicrobial composition wherein the surfactant is selected from the group consisting of polysorbate 20, polysorbate 80, polysorbate 40, polysorbate 60, polyglyceryl ester, polyglyceryl monooleate, decaglyceryl monocaprylate, propylene glycol dicaprilate, triglycerol monostearate, sorbitane monooleate, ethoxylated castor oil surfactants, and mixtures thereof.

18. A method for extending the shelf-life of water, feed or feed ingredients, against *Salmonella*, the method comprising spray-treating or admixing to the water, feed or feed ingredients an effective amount of an antimicrobial composition that comprises:
(a) an organic carboxylic acids (RCOOH) aqueous solution having a total organic carboxylic acid content that is in a range of 20 to 95 wt. % of the antimicrobial composition, wherein the organic carboxylic acids (RCOOH) aqueous solution comprises:
(i) a buffered short-chain acid aqueous solution having a pH in a range of 1-3, wherein the buffered short-chain acid aqueous solution comprises a buffering agent and a short-chain acid, wherein the short-chain acid is at a concentration in a range of 80 to 95 wt. % of the total organic carboxylic acid content in the organic carboxylic acids aqueous solution, and wherein the short-chain acid is propionic acid, and wherein the buffering agent is ammonium hydroxide; and
(ii) pelargonic acid ($CH_3(CH_2)_7COOH$) at a concentration in a range of 5 to 20 wt. % of the total organic carboxylic acid content in the organic carboxylic acids aqueous solution;
(b) a terpene at a concentration in a range of 0.5 to 20 wt. % of the antimicrobial composition, wherein the terpene is selected from the group consisting of allyl disulfide, citral, pinene, nerol, geraniol, carvacrol, eugenol, carvone, anethole, camphor, menthol, limonene, farnesol, carotene, thymol, borneol, myrcene, terpenene, linalool, and mixtures thereof; and
(c) a surfactant at a concentration that is in a range of 0.5 to 20 wt. % of the antimicrobial composition wherein the surfactant is selected from the group consisting of polysorbate 20, polysorbate 80, polysorbate 40, polysorbate 60, polyglyceryl ester, polyglyceryl monooleate, decaglyceryl monocaprylate, propylene glycol dicaprilate, triglycerol monostearate, sorbitane monooleate, ethoxylated castor oil surfactants, and mixtures thereof.

\* \* \* \* \*